United States Patent
Kobyakov et al.

(10) Patent No.: US 9,865,008 B2
(45) Date of Patent: Jan. 9, 2018

(54) DETERMINING A CONFIGURATION OF A CONTENT ITEM DISPLAY ENVIRONMENT

(71) Applicant: Google Inc., Mountain View, CA (US)

(72) Inventors: Pavel Kobyakov, Waterloo (CA); Fedor Labounko, Brooklyn, NE (US)

(73) Assignee: Google LLC, Mountain View, CA (US)

( * ) Notice: Subject to any disclaimer, the term of this patent is extended or adjusted under 35 U.S.C. 154(b) by 252 days.

(21) Appl. No.: 14/429,715

(22) PCT Filed: Sep. 20, 2012

(86) PCT No.: PCT/UA2012/000087
§ 371 (c)(1),
(2) Date: Mar. 19, 2015

(87) PCT Pub. No.: WO2014/046637
PCT Pub. Date: Mar. 27, 2014

(65) Prior Publication Data
US 2015/0242908 A1    Aug. 27, 2015

(51) Int. Cl.
*G06Q 30/02* (2012.01)

(52) U.S. Cl.
CPC ......... *G06Q 30/0277* (2013.01); *G06Q 30/02* (2013.01)

(58) Field of Classification Search
None
See application file for complete search history.

(56) References Cited

U.S. PATENT DOCUMENTS

| 6,115,690 A | 9/2000 | Wong |
| 6,615,251 B1 | 9/2003 | Klug et al. |

(Continued)

FOREIGN PATENT DOCUMENTS

| CN | 1689002 | 9/2003 |
| WO | 2000/019332 | 10/2001 |
| WO | WO 03025696 A2 * | 3/2003 ............. G06Q 30/02 |

OTHER PUBLICATIONS

"Making Rich Media Scale" (published online at https://blog.appnexus.com/2011/rich-media/ on Aug. 1, 2011).*

(Continued)

*Primary Examiner* — James M Detweiler
(74) *Attorney, Agent, or Firm* — Foley & Lardner LLP

(57) ABSTRACT

Methods, and systems, including computer programs encoded on computer-readable storage mediums, including a method for determining a configuration of a content item display environment. The method includes receiving a content item request for a content item to display in a content item display environment in a resource, the resource hosted on a first domain and the content item display environment hosted on a second domain, wherein the first domain includes a publisher side file; providing the content item along with measuring instructions operable to interact with the publisher side file to generate a child display environment, wherein the measuring instructions interact with the resource through the child display environment to cause measurement data to be generated, wherein the measuring instructions are prevented from interacting with the resource through the content item display environment; and receiving the measurement data specifying a configuration of the content item display environment and the resource.

9 Claims, 5 Drawing Sheets

(56) References Cited

U.S. PATENT DOCUMENTS

| | | |
|---|---|---|
| 6,725,287 B1 | 4/2004 | Loeb et al. |
| 6,973,436 B1 | 12/2005 | Shkedi |
| 7,610,560 B2 | 10/2009 | Horvitz et al. |
| 7,746,343 B1 | 6/2010 | Charaniya et al. |
| 7,853,492 B1 | 12/2010 | Kirklin et al. |
| 7,979,382 B2 | 7/2011 | Guyan et al. |
| 8,237,937 B2 | 8/2012 | Sugiyama et al. |
| 8,350,849 B1 | 1/2013 | Jones et al. |
| 8,352,539 B2 | 1/2013 | Mizuno |
| 8,462,949 B2 | 6/2013 | Anderson et al. |
| 8,510,167 B2 | 8/2013 | Lisbakken |
| 8,578,057 B2 | 11/2013 | Omar et al. |
| 8,606,723 B2 | 12/2013 | Seubert et al. |
| 8,694,632 B1 | 4/2014 | Shubina et al. |
| 8,751,304 B1 | 6/2014 | Kobyakov et al. |
| 2002/0042786 A1 | 4/2002 | Scarborough et al. |
| 2002/0046199 A1 | 4/2002 | Scarborough et al. |
| 2002/0152305 A1 | 10/2002 | Jackson et al. |
| 2002/0169803 A1 | 11/2002 | Sampath et al. |
| 2003/0137512 A1 | 7/2003 | Hoehn et al. |
| 2003/0182310 A1 | 9/2003 | Charnock et al. |
| 2003/0182394 A1 | 9/2003 | Ryngler et al. |
| 2004/0024717 A1 | 2/2004 | Sneeringer |
| 2004/0193388 A1 | 9/2004 | Outhred et al. |
| 2004/0205711 A1 | 10/2004 | Ishimitsu et al. |
| 2006/0074730 A1 | 4/2006 | Shukla et al. |
| 2007/0150387 A1 | 6/2007 | Seubert et al. |
| 2007/0299857 A1 | 12/2007 | Gwozdz et al. |
| 2008/0201412 A1 | 8/2008 | Wayne |
| 2008/0288342 A1 | 11/2008 | Ingleshwar |
| 2009/0040246 A1 | 2/2009 | Miyasaka |
| 2009/0099901 A1 | 4/2009 | Sah et al. |
| 2009/0187583 A1 | 7/2009 | Pape et al. |
| 2009/0299862 A1 | 12/2009 | Fan et al. |
| 2009/0327869 A1* | 12/2009 | Fan .................. G06Q 30/02 715/240 |
| 2010/0082657 A1 | 4/2010 | Paparizos et al. |
| 2010/0185513 A1* | 7/2010 | Anderson ............ G06Q 30/02 705/14.49 |
| 2010/0306249 A1 | 12/2010 | Hill et al. |
| 2010/0313129 A1 | 12/2010 | Hyman |
| 2011/0029393 A1* | 2/2011 | Apprendi ........... G06Q 30/0277 705/14.73 |
| 2011/0055685 A1 | 3/2011 | Jaquish et al. |
| 2011/0071818 A1 | 3/2011 | Jiang |
| 2011/0153435 A1 | 6/2011 | Pisaris-Henderson |
| 2011/0161990 A1* | 6/2011 | Smith ............... G06F 17/30861 719/328 |
| 2012/0101907 A1 | 4/2012 | Dodda |
| 2013/0185164 A1* | 7/2013 | Pottjegort .............. G06Q 30/02 705/14.73 |
| 2013/0238994 A1 | 9/2013 | Yurasits |
| 2013/0275901 A1 | 10/2013 | Saas et al. |
| 2013/0339896 A1 | 12/2013 | Shadle et al. |
| 2014/0164923 A1 | 6/2014 | Georgiev et al. |
| 2014/0164985 A1 | 6/2014 | Pimmel et al. |
| 2014/0240293 A1 | 8/2014 | McCaughan et al. |

OTHER PUBLICATIONS

Gilbert, "Set IFRAME height based on size of remotely loaded content," solidgone Blog, Mar. 13, 2010, Retrieved from the Internet: URL http://solidgone.org/Set-IFRAME-height-based-on-size-of-remotely-loaded-content, [retrieved on Jun. 11, 2013], 10 pages.

How do iframe busters for expandable ads work?; javascript—How do iframe busters for expandable ads work?—Stack Overflow; http://stackoverflow.com/questions/5553469/how-do-iframe-busters-for-expandable-ads-work; Aug. 15, 2012; 3 pages.

International Search Report and Written Opinion in International Application No. PCT/UA2012/000087, dated Jun. 20, 2013, 12 pages.

Introducing expandable ads on AdSense sites—Inside AdSense; Inside AdSense Blog; http://adsense.blogspot.com/2009/03/introducing-expandable-ads-on-adsense.html; Aug. 14, 2012; Mar. 4, 2009; 8 pages.

Macro overview; dfp DoubleClick for Publishers; http://support.google.com/dfp_premium/bin/answer.py?hl=en&answer=1242718; Aug. 14, 2012; 7 pages.

Peters, "Iframe loading techniques and performance", aaronpeters.nl, Dec. 20, 2010, on line at http://www.aaronpeters.nl/blog/iframe-loading-techniques-performance?%3E, 11 pages.

Wegert, "Expanding Options in Expandable Ads," Jun. 4, 2009; ClickZ/Marketing News & Expert Advise; http://www.clickz.com/clickz/column/1699404/expanding-options-expandable-ads; Aug. 15, 2012; 3 pages.

Wikipedia [online]. "AllowSeamless," from WHATWG Wiki, May 24, 2012 [Retrieved on Jul. 5, 2012]. Retrieved from the Internet: URL <http://wiki.whatwg.org/wiki/AllowSeamless>, 3 pages.

Office Action for Chinese Patent Application No. 201280077165.8 dated Jun. 20, 2017.

* cited by examiner

DETERMINING A CONFIGURATION OF A CONTENT ITEM DISPLAY ENVIRONMENT

BACKGROUND

This specification generally relates to information presentation.

Sponsored content (e.g. advertisements) can be provided over the Internet to various user devices. For example, a resource (e.g., web page) can include content item display environments (e.g., advertisement slots such as iFrames) in which sponsored content can be presented. These environments can be defined in the resource or defined for presentation with the resource, for example, along with search results or other content. Sponsored content can also be delivered through dedicated web portals or applications executing on user devices.

SUMMARY

In general, one aspect of the subject matter described in this specification can be implemented in methods that include receiving a content item request for a content item to display in a content item display environment in a resource. The resource being hosted by a device belonging to a first domain of a first publisher and the content item display environment being hosted by a device belonging to a second domain, different from the first domain, of a second publisher different from the first publisher. The first domain includes a publisher side file, hosted by a device belonging to the first domain, that facilitates display of a content item from the second publisher in the content item display environment. In response to receiving the content item request, providing the content item along with measuring instructions, the measuring instructions being operable to interact with the publisher side file to generate a child display environment in the content item display environment. The child display environment being a hierarchical child of the content item display environment in a document object model representation of the resource. The measuring instructions interact with the resource through the child display environment to cause measurement data for the content item display environment to be generated, and where the measuring instructions are prevented from interacting with the resource through the content item display environment. Receiving the measurement data specifying a configuration of the content item display environment and the resource.

Other embodiments of this aspect include corresponding systems, apparatus, and computer programs, configured to perform the actions of the methods, encoded on computer storage devices.

These and other embodiments can each optionally include one or more of the following features. The method can include receiving a second content item request for a second content item to display in the content item display environment where the second content item request is received subsequent to the content item request, selecting the second content item from a plurality of second content items based at least in part on the measurement data, and providing data specifying the second content item. The method can include determining that a position of the content item display environment permits the expandable advertisement to be expanded without intersecting a boundary of the resource.

The content item display environment can be a first iFrame and the child display environment can be a second iFrame nested in the first iFrame. The content item can be an expandable advertisement or an above-the-fold advertisement. An expandable advertisement is an advertisement that expands in response to an indication of user interest in the expandable advertisement and an above-the-fold advertisement is an advertisement that is displayed in a viewport of a user device rendering the resource upon an initial rendering of the resource.

In some implementations, the measuring instructions do not modify instructions defining the resource and are prevented from interacting with the resource through the content item display environment by at least one of security measures in the resource or security measures in a browser application facilitating a display of the resource.

Particular implementations of the subject matter described in this specification can be implemented to realize one or more or none of the following advantages. Measuring instructions are provided with a content item, which is for display in a content item display environment on a resource. The measuring instructions, upon execution, cause a child display environment of the content item display environment to be instantiated in the content item display environment. Resource data that specify or define the resource can be accessed from the resource through the child display environment where such access is not otherwise permitted through the content item display environment. Thus measurement data specifying the configuration of the resource and the content item display environment (e.g., the layout of the resource and content item display environment) can be obtained or derived from the resource data and used to determine which content items will properly render in the content item display environment (e.g., which expandable content items can be fully rendered in an expanded form) or that the content items are displayed in desired locations on the resources (e.g., displayed above the fold).

Ensuring content items properly render in content item display environments enhances the user experience. Enhancing the user experience can lead, for example, to increased monetization of content items for the content sponsors. Ensuring that content items are displayed in advertiser desired locations on publishers' resources increases the likelihood that content item sponsors will continue to place content items on those publishers' resources, which, in turn, increases revenues for the publishers.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various figures indicate like elements.

DETAILED DESCRIPTION

Figure 1:
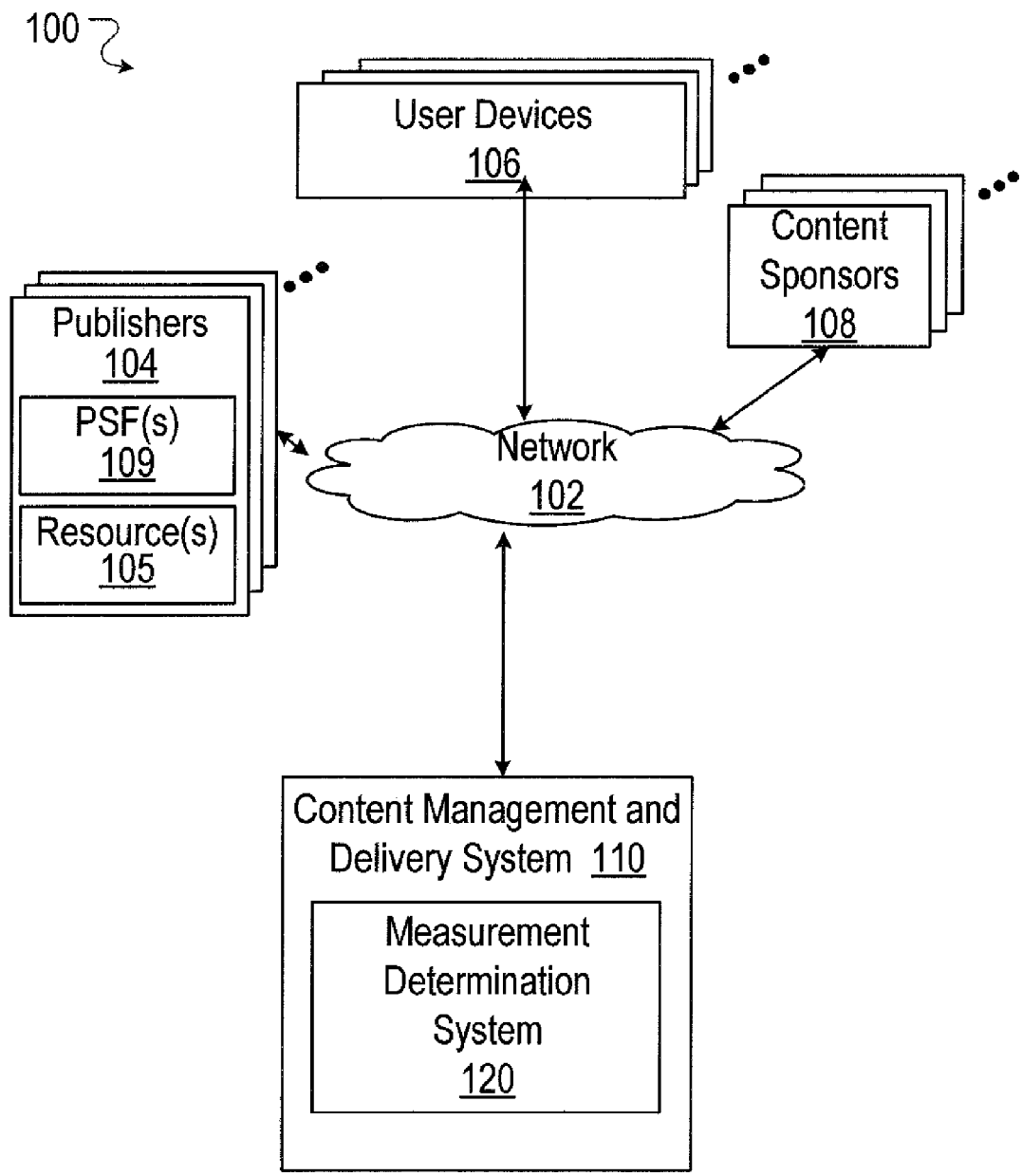
FIG. 1 is a block diagram of an example environment for delivering content.

The eligibility of some content items to be displayed in particular content item display environments depends on the configurations of the content item display environment and the resource on which the content item display environment resides (e.g., the relative position of the content item display environment on the resource, the size of the content item display environment, the size of the resource). For example, such a configuration dependent content item is an expandable content item (e.g., an expandable advertisement) that can be initially presented in an unexpanded form (e.g., in a 728×90 pixel form) and, when an expansion event occurs, can be presented in expanded form (e.g., in a 728×270 pixel form). The expanded form of the expandable content item should "fit" inside the resource to prevent unwanted effects such as clipping or failure to render. For example, if the expandable content item is in a content item display environment in the top left corner of the resource and attempts to expand up into the top border of the resource the expandable content item may fail to or improperly render in its expanded form.

Another exemplary configuration dependent content item is an above the fold content item that, as described below, is designated to be displayed only in content item environments that are above the fold (e.g., displayed in a content item display environment that is visible upon the initial rendering of the resource). Thus an above the fold content item should not be selected for display in a content item display environment that will not be visible to a user upon the initial rendering of the resource (e.g., the content item display environment is below the fold and the user must scroll down to see it).

Thus for such configuration dependent content items the configuration of the content item display environment must be known to a content management and delivery system to ensure that the selected content item can properly render or be displayed in a desired location. The configuration of a content item display environment can be determined in multiple ways. For example, the content management and delivery system can include user device instructions with a content item provided for display in a content item display environment that cause the user device to return configuration information about the content item display environment. However, in some scenarios, such user device instructions are prevented from accessing the relevant configuration information from the resource for network or system security reasons. For example, security measures in some browsers or other user device applications prevent instructions included with content items displayed in certain types of content item display environments (e.g., iFrames) from accessing the resource data of a resource. This is a cross-site scripting restriction intended to prevent malicious code in the instructions from accessing or changing the resource data or otherwise unwantedly affecting the rendering user device.

This description generally relates to determining measurement data about the configuration (e.g., relative position, size) of a content item display environment (e.g., iFrame advertisement slot) for displaying a content item (e.g., an advertisement) on a resource (e.g., web page), where the content item display environment belongs to a domain different from the domain of the resource and, in some cases, is hosted by a publisher different from the publisher of the resource. For example, the size of a web page and the relative position and size of a third-party iFrame advertisement slot on the web page is determined.

As described above, some security models prevent instructions (e.g., script) running in a third party content item display environment from accessing the resource on which the third-party display environment is presented/rendered. Thus instructions running in the content item display environment cannot access the resource data to determine configuration information about the content item display environment and the resource. To address this limitation, as described below, measuring instructions are provided with a content item (or some percentage of content items) to be displayed in a content item display environment that cause a child display environment to be instantiated in the content item display environment. The child display environment is configured in a way that permits the resource data of the resource to be available for inspection by a process running in the child display environment to facilitate the generation of configuration information about the resource.

More particularly, the measuring instructions interact with a publisher side file hosted on a server belonging to the domain of the resource to generate a child display environment in the content item display environment (e.g., a nested iFrame in an iFrame advertisement slot). The measuring instructions further interact with the resource, through the child display environment, to generate measurement data about the configuration of the content item display environment and the resource. For example, the measuring instructions interact with (e.g., pass parameters to) the publisher side file through the child display environment to cause the user device presenting the resource to access configuration determination instructions (e.g., a script) from a server. The configuration determination instructions run with (in the context of) the resource and have access to the resource data on the domain of the resource necessary to generate the measurement data for the content item display environment and the resource. In some implementations, the measurement determination system generates and provides the measuring instructions as described below.

FIG. 1 is a block diagram of an example environment 100 for delivering content. The example environment 100 includes a content management and delivery system 110 for selecting and providing content to user devices 106. The example environment 100 also includes a network 102, such as wide area network (WAN), the Internet, or a combination thereof. The network 102 connects publishers 104, user devices 106, content sponsors 108 (e.g., advertisers) and the measurement determination system 120 (which may be part of or separate from the content management and delivery system 110). The example environment 100 may include numerous publishers 104, user devices 106, and content sponsors 108.

In some implementations, the content management and delivery system 110 includes a request handler that can receive a request for content, a content item request, from a user device 106, identify one or more content items (which may include one or more expandable content items or above the fold content items), and provide a reply with a content item responsive to the request. As described below, in some implementations, the reply includes data specifying measuring instructions that facilitate the generation of measurement data (e.g., relative position, size) about a content item display environment and resource.

A publisher 104 typically manages a website that includes one or more resources 105 associated with a domain name and hosted by one or more servers. An example website is a collection of web pages formatted in hypertext markup language (HTML) that can contain text, images, multimedia content, and programming elements, such as scripts. Each publisher 104 is an entity that controls, manages and/or owns the website. A domain is specified by an identification string that defines a realm of administrative autonomy, authority, or control in the Internet. The domain can be resolved to one or more internet protocol (IP) addresses. An IP address is a numerical label assigned to devices, e.g., user devices 106 and servers 103, on the network 102. A domain, for example, is exampledomain.com, which corresponds to IP address X.X.X.X or exampledomain.biz, which corresponds to IP address Y.Y.Y.Y.

A resource 105 can be any data that can be provided over the network 102. A resource 105 can be identified by a resource address (e.g., uniform resource locator, "URL") that is associated with the resource 105. Resources include HTML pages, word processing documents, portable document format (PDF) documents, images, video, and news feed sources, to name only a few. The resources 105 can include content, such as words, phrases, images, video and sounds, that may include embedded information (such as meta-information hyperlinks) and/or embedded instructions (such as scripts). In some implementations, the resources 105 can include sponsored content provided by the content sponsors 108 that can be rendered in specific locations (e.g., content item display environments such as advertisement slots) in the resource 105. For example, the resources 105 can include an advertisement sponsored by a content sponsor 108.

To facilitate the processing of content items in particular types of content item display environments, such as iFrames, a content item provider provides a "publisher side file" (PSF) 109 for a publisher host. The PSF 109 includes instructions that are used by user devices 106 rendering resources 105, for example, to ensure content items on the resources 105 are properly rendered. PSFs 109 are stored on a device (e.g., server) on the same domain as the device hosting the resource 105, as described below.

A user device 106 is an electronic device that is under control of a user and is capable of requesting and receiving resources 105 over the network 102. Example user devices 106 include personal computers, televisions with one or more processors embedded therein or coupled thereto, set top boxes, mobile communication devices (e.g., smartphones), tablet computers, e-readers, laptop computers, personal digital assistants (PDA), and other devices that can send and receive data over the network 102. A user device 106 typically includes one or more user applications, such as a web browser, to facilitate the sending and receiving of data over the network 102.

A user device 106 can request resources 105 from a publisher 104. In turn, data representing the resource 105 can be provided to the user device 106 for presentation by the user device 106. The data representing the resource 105 can also include data specifying a portion of the resource 105 or a portion of a user device display in which content can be presented. These specified portions of the resource 105 or user device display are referred to as content item display environments (e.g., content item slots, or, in the case of advertisement content items, advertisement slots).

When a resource 105 is requested by a user device 106 and the resource 105 includes a content item display environment in which a content item of a content sponsor 108 is to be rendered, the content management and delivery system 110 receives a request for a content item (e.g., from the user device 106 or the server hosting the requested resource 105).

The content management and delivery system 110 can select content items, from a pool of eligible content items, that are to be provided to the user device 106 based at least in part, for example, on results of a selection process (e.g., the results from an auction). For example, for expandable content items, the content management and delivery system 110 must first determine which expandable content items are eligible to participate in the selection process. One eligibility factor is expansion direction. In particular, an expandable content item that expands in a particular direction should only be eligible for the selection process if there is space available on the resource 105 for the content item display environment to expand in that particular direction. For example, a content item display environment at the bottom of a resource 105 should not be served an expandable content item that expands in the "down" direction as the expandable content item will likely fail to properly expand given that the bottom border of the resource 105 will prevent the expandable content item from expanding down.

By way of another example, another eligibility factor is whether the content item is an above (or below) the fold content item. An above the fold content item is a content item that is displayed or is designated (e.g., by a content item sponsor) to be displayed/placed in a content item display environment on a resource 105 that is visible in the viewport of a user device 106 when the resource 105 is initially rendered by the user device 106. In general, a "fold" can be, for example, the bottom, top, or side of the viewport of the user device 106 or the active browser window. By contrast, a below the fold content item is a content item that is placed or is designated to be placed in a content item display environment on the resource 105 that is not visible in the viewport when the resource 105 is initially rendered by the user device 106. In other words, a user needs to scroll the resource 105 "down" below the fold to cause a below the fold content item to be visible.

Regardless of the eligibility factors or requirements for a particular selection process, once the content management and delivery system 110 has identified a pool of eligible content items, in some implementations, the content management and delivery system 110 can select one or more content items from the pool by conducting an auction or by another selection process (e.g., reservation). The content management and delivery system 110 can, for example, select the content items based on various criteria, such as interest profiles, the relevance of content items to content on the resource 105, to a time of the day, geographical location, and keywords to name a few examples. For situations in which the systems discussed here collect personal information about users, the users may be provided with an opportunity to opt in/out of programs or features that may collect personal information (e.g., information about a user's social network, social actions or activities, profession, a user's preferences, or a user's current location). In addition, certain data may be anonymized in one or more ways before it is stored or used, so that personally identifiable information is removed or obfuscated. In some implementations, users can opt out of being characterized for content, including advertisements, based on the interest profiles for which they may be characterized.

As described above, in some implementations, to identify eligible content items (e.g., content items that will properly render in the content item display environment or be displayed in a desired location) the configuration of the resource 105 and the relevant content item display environment must be known. Thus the determination of eligibility is dependent on the configuration of the resource 105 and content item display environment in which the content item will be displayed. For example, the relative position of the content item display environment as rendered on the resource 105 and the size of the resource 105 must be known to ensure that an expandable content item displayed in the content item display environment, when expanded, will render properly. By way of another example, the relative position of the content item display environment as rendered on the resource 105 must be known (along with the size of the viewport and the position of the resource 105 in the viewport) to ensure that an above the fold content item placed in the content item display environment will, in fact, be above the fold when the resource 105 is rendered.

In some scenarios, the configuration of the resource 105 and content item display environment is already known (e.g., previously determined or provided) or readily ascertainable (e.g., provided by the user device 106 with the content item request).

Figure 2A:
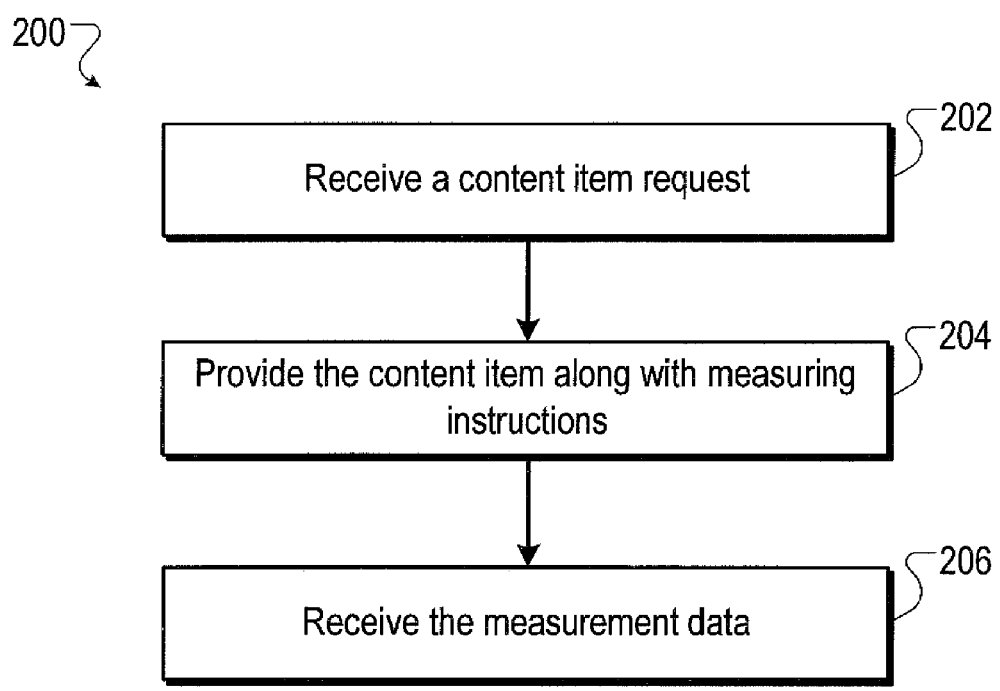
FIG. 2A is a flow diagram of an example process for obtaining measurement data for a content item display environment.

However, in some scenarios the configuration of the resource 105 and content item display environment may not be known or readily ascertainable. For example, for a newly placed third party content item display environment on a resource 105 there may not have been any past content item requests that required determination of the configuration information and the content item request may not include the configuration information necessary to determine eligible content items. The system 110, however, cannot simply run a script on the resource 105 to determine the configuration of the resource 105 due to cross-site (e.g., cross-domain) restrictions. Thus the measurement determination system 120 can facilitate the determination of the configuration information as described with reference to FIG. 2A, which is a flow diagram of an example process for obtaining measurement data for a content item display environment.

The process 200 receives a content item request for a content item to display in a content item display environment in a resource (202). In some implementations, the content management and delivery system 110 receives a request for a content item (e.g., advertisement). The resource 105 (e.g., web page) belongs to a first domain hosted by a first publisher and the content item display environment belongs to a second domain different from the first domain and is hosted by a second publisher different from the first publisher. For example, the resource 105 is hosted by a server belonging to the first domain exampledomain1.com of Publisher 1 and the content item display environment is hosted by a server belonging to the second domain exampledomain2.com of Publisher 2 (e.g., the content item display environment is hosted by a content item server (advertisement server) that serves the content item). Thus the second publisher (e.g., Publisher 2) can be, for example, the content sponsor (e.g., advertiser) of the content item or can be the entity hosting the content item server (e.g., advertisement server).

Continuing, the resource 105 can be a web page on the first domain and the content item display environment can be an iFrame content item slot on the resource. As the iFrame is on a domain different from that of the web page and has a publisher different from that of the web page, the iFrame is referred to as a third party iFrame or third party content item display environment, more generally. Many resources 105 use third party content item display environments to facilitate the display of content items (e.g., advertisements) as the selection and provision of the content items are handled by the publishers of the third party content item display environments, for example, thereby removing such a burden from the resource publisher 104.

As described above, among other uses, to facilitate the proper rendering of a content item, the first domain includes a publisher side file (or multiple publisher side files, one for each content item sponsor or provider eligible to have their content items placed on the resource). The publisher side file (e.g., an HTML file) is hosted by a server belonging to the first domain and includes instructions, executable by the rendering user device 106/browser application, to facilitate the display of a content item in a content item display environment on the resource 105. For example, a PSF can include instructions that facilitate the expansion of an expandable content item or otherwise facilitate the display of a content item, hosted by a device on a domain different from that of the resource, in a content item display environment on the resource.

Because the PSF is stored on a device belonging to the first domain, which is the same domain as a device hosting the resource 105, instructions in the PSF are permitted to cause a user device to access the resource data of the resource 105. For example, because the PSF and resource 105 are hosted by devices belonging to the first domain, browser and/or resource security features allow the user device 106, at the direction of the PSF instructions, to access the resource data. If the PSF and resource 105 were hosted by devices belonging to different domains, relevant browser and/or resource security features would not allow the user device 106 to access the resource data at the direction of the PSF instructions. The resource data are data that specify or define the resource 105 such as, for example, data specifying the HTML or document object model (DOM) defining or representing the resource 105. For convenience, a file or data stored or hosted on a device belonging to a domain can be referred to as simply being on the domain.

The process 200, in response to receiving the content item request, provides the content item along with measuring instructions (204). In some implementations, the measurement determination system 120 provides measuring instructions (e.g., a script) to the content management and delivery system 110 (e.g., for a predetermined percentage of content item requests). The content management and delivery system 110 selects a content item responsive to the content item request, as described above. The content management and delivery system 110 then sends data specifying the selected content item and measuring instructions to the requesting user device 106.

In some implementations, the content management and delivery system 110 appends the data specifying the measuring instructions to the data specifying the selected content item and sends the resulting composite data set to the user device 106 issuing the content item request. For example, the content management and delivery system 110 appends a measuring instruction script to the HTML defining the selected content item and provides the HTML with the appended script to the requesting user device 106. As such, when the requesting user device 106 receives and processes the HTML of the selected content item, the user device 106 also executes the measuring instructions.

Generally, the measuring instructions are operable to interact with the publisher side file on the first domain to generate a child display environment in the content item display environment, which is on the second domain (e.g., as it is provided by a third party vendor or sponsor). More particularly, the measuring instructions include instructions that cause the user device 106 to determine if the content item is being placed in the content item display environment on the second domain (e.g., in a third party iFrame) or, more generally, in a content item display environment on a domain other than the domain of the resource (e.g., the first domain). For example, the measuring instructions can cause the user device 106 to try to access the DOM of the resource 105 from the content item display environment. If the access attempt is unsuccessful (e.g., an error message is generated as browser security features block the access attempt), then the content item display environment is determined to be on a domain other than the first domain (e.g., the second domain).

Figure 2B:
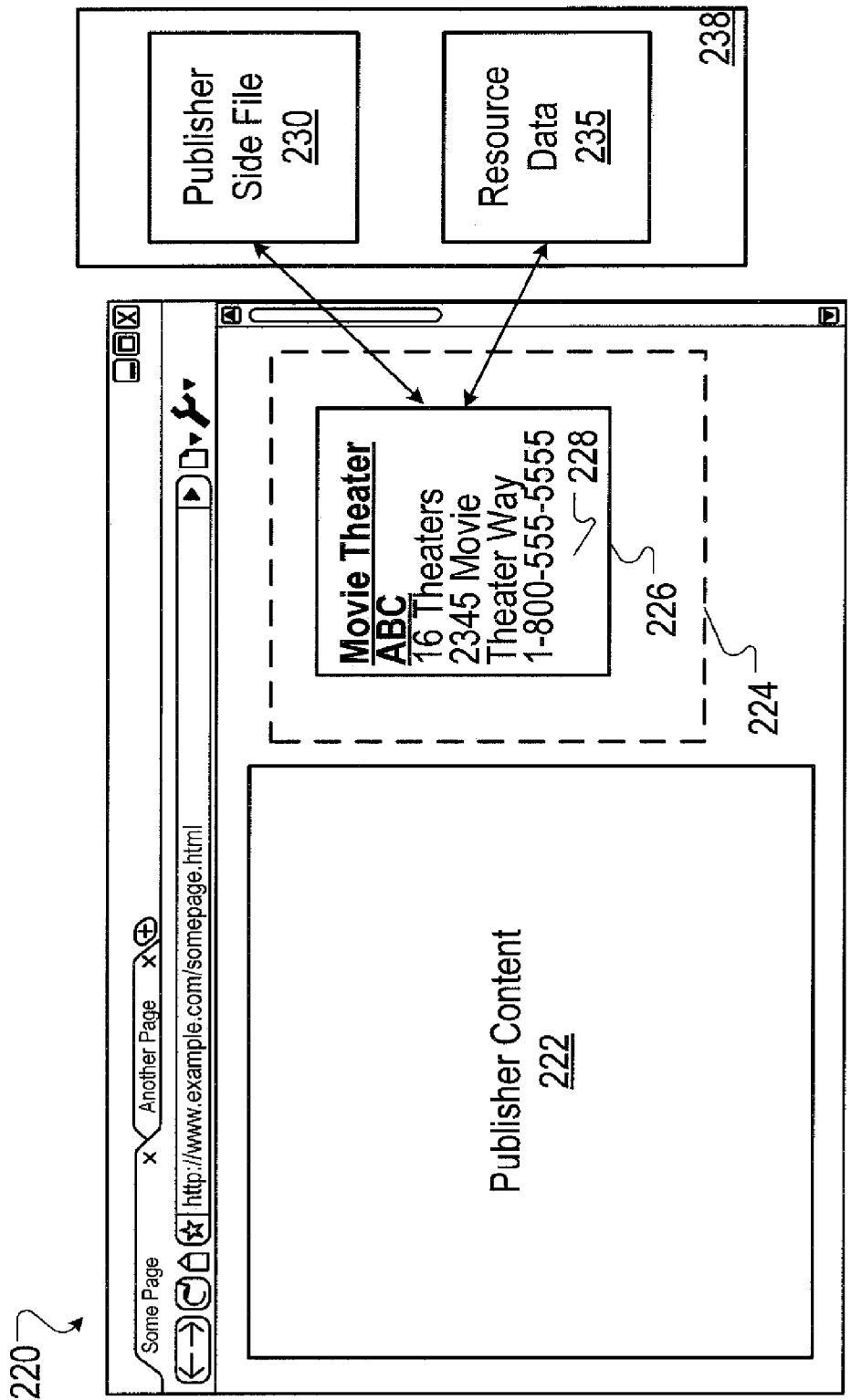
FIG. 2B depicts a user interface displaying a child display environment.

In response to determining that the content item display environment is on a domain other than the first domain, the measuring instructions cause the user device 106 to generate a child display environment in the content item display environment. For example, if the content item display environment is an iFrame, the measuring instructions cause the user device 106 to generate a second iFrame within the original iFrame (e.g., generate a nested iFrame in the original iFrame). Regardless of the particular format or type of the child display environment, the child display environment is a hierarchical child of the content item display environment, for example, in the context of a document object model representation of the resource. In other words, the child display environment is an environment subordinate to the content item display environment. For example, the instantiation of the child display environment is in and under the dominion of the content item display environment. An exemplary child display environment is shown in FIG. 2B, which depicts a user interface 220 displaying a child display environment 226.

The user interface 220 (e.g., a browser application) shows a resource 105 that includes publisher content 222 and is authored by a first publisher 104 that is hosted on a first domain. The resource 105 also includes a content item display environment 224 from a second publisher 104 that is hosted on a second domain different from the first domain. Additionally, the resource 105 includes a child display environment 226 instantiated in the content item display environment 224 displaying a content item 228 (e.g., advertisement). As described below the child display environment is treated as being on the first domain.

In some implementations, to cause the child display environment 226 to be generated the measuring instructions include instructions to generate the child display environment 226 based on source data in the publisher side file, which is on the first domain. For example, the source data can be data defining a blank HTML page and the measuring instructions cause the user device 106 to use the data defining the HTML page in the publisher side file as the source data for creating the child display environment 226.

As the publisher side file is the source for the child display environment 226 and the publisher side file is on the first domain, when the user device 106 loads/renders the child display environment 226, the child display environment 226 is treated as if it is on the first domain with the resource 105 even though the child display environment 226 is a child of the content item display environment 224, which is hosted on the second domain. Thus the measuring instructions are not subject to the security measures that apply to interaction between environments and files on different domains, and the measuring instructions can gain access to the first domain. For convenience, instructions that access data or a domain means the instructions cause a device (e.g., user device 106) to access the data or domain. For example, with reference to FIG. 2B, the measuring instructions can gain access to the publisher side file 230 and the resource data 235 on the first domain 238 through the child display environment 226 (e.g., even though the child display environment 226 is in the content item display environment 224, which is on the second domain, as represented by the dashed lines). In some implementations, the capabilities of the measurement instructions are limited to the types of measurement functionalities described herein and the ancillary operations to affect such measurement functionalities.

The measuring instructions can also cause an identifier for the content item display environment 224 to be passed to the publisher side file 230 for use in identifying the content item display environment 224 from other content display environments on the resource. As described below, such identification is used to determine which content item display environment measurement data is to be generated for. The identifier can be, for example, the source URL of the content item display environment 224, a hash of the source URL of the content item display environment 224, another form of identification that can differentiate the content item display environment 224 from other the content item display environments on the resource (if any).

As described above, as the measuring instructions can access the first domain, because the child display environment 226 is treated as being on the first domain, the measuring instructions can interact with the publisher side file 230 to cause configuration determination instructions to be accessed and executed (e.g., by the user device 106). For example, the measuring instructions can interact with the publisher side file 230 (e.g., by passing parameter and instruction data to the publisher side file 230) to cause the user device 106 to access (e.g., download) the configuration determination instructions from a server on the second domain and execute the configuration determination instructions from the publisher side file 230 (e.g., from the context of the publisher side file 230). Thus the configuration determination instructions are executed by the user device 106 from the context of the resource/first domain and can access the resource data 235 to cause the user device 106 to generate measurement data as described below.

The configuration determination instructions cause the user device 106 to access the resource data 235 for the resource 105 and identify content item display environments on the resource 105 (e.g., there could be multiple content item display environments on the resource). The configuration determination instructions cause the user device 106 to compare identifiers of the identified content item display environments with the identifier for the content item display environment 224 having the child display environment 226, and for which the content item request was generated ("the subject content item display environment"), to locate the subject content item display environment. After the subject content item display environment has been identified, the configuration determination instructions cause the user device 106 to generate measurement data for the subject content item display environment.

The configuration determination instructions can cause the user device 106 to generate the measurement data in numerous ways. For example, the configuration determination instructions can cause the user device 106 to access the DOM of the resource 105 and walk across the DOM to identify the content item display environments on the resource 105. As the DOM is "walked", the user device 106 compares the identifier of the subject content item display environment with those of the content item display environments encountered during the DOM walk. By way of another example, the configuration determination instructions can cause the user device 106 to parse the HTML of the resource 105 to identify the content item display environments based on tags in the HTML of the resource 105.

After identifying the subject content item display environment, the configuration determination instructions cause the user device 106 to generate measurement data for the subject content item display environment. For example, the configuration determination instructions cause certain DOM application programming interfaces (APIs) to be invoked to determine the measurement data (e.g., by parsing the resource data 235). The measurement data specify the configuration of the subject content item display environment and the resource 105. The configuration of the subject content item display environment and the resource 105 generally describes the layout of the subject content item display environment and the resource 105. For example, the measurement data specify the size (e.g., dimensions) of the resource 105 and of the subject content item display environment, and the relative position of the subject content item display environment on the resource 105. The size of the resource 105 and the subject content item display environment can be specified in terms of the height and width of the resource 105 and of the subject content item display environment. For example, the measurement data specify that the resource 105 has a height and width of X pixels and Y pixels, respectively, and the subject content item display environment has a height and width of A pixels and B pixels, respectively.

The relative position of the subject content item display environment is the position of the subject content item display environment relative to the borders (e.g., boundaries) of the resource 105 and, in some implementations, relative to the borders of other content on the resource 105. For example, the relative position of the top left corner of the subject content item display environment from the top left corner of the resource 105 is 100 pixels dowry from the top border of the resource 105 and 125 pixels to the right of the left border of the resource 105. The measurement data can also specify the relative position and size of other content on the resource 105.

Thus, more generally, the measuring instructions interact with the resource 105 through the child display environment to cause measurement data for the subject content item display environment to be generated. For example, the measuring instructions interact with the resource 105 by causing the user device 106 to access and inspect the resource data of the resource 105. As described above, such interaction directly through the subject content item display environment would be prevented by various security measures such that the measurement data could not be generated. Further such interaction does not modify the resource data (e.g., the measuring instructions do not modify the HTML of the resource 105, as some publishers restrict or prohibit modification of their resources 105).

The process 200 receives the measurement data (206). For example, the configuration determination instructions cause the user device 106 to send the measurement data to the measurement determination system 120. The measurement determination system 120 can store the measurement data for the subject content item display environment in a data store for later use.

In some implementations, the content management and delivery system 110 can use the measurement data to process subsequent content item requests for the subject content item display environment. For example, the content management and delivery system 110 receives a second content item request for a content item to display in the subject content item display environment subsequent to the first content item request that resulted in the generation of the measurement data for the subject content item display environment. In turn, the content management and delivery system 110 selects the second content item based on the measurement data. For example, the second content item is an expandable content item and the content management and delivery system 110 selects the second content item, in part, based on an analysis of the expansion direction of the second content item and the measurement data (e.g., to ensure the second content item will not expand into a border of the resource 105). The content management and delivery system 110 can then provide data specifying the second content item to the requesting user device 106 to satisfy the second content item request.

For example, to determine for subsequent content item requests for the subject content item display environment, the content management and delivery system 110 can use the measurement data to determine if certain expandable advertisements are eligible to be displayed in the subject content item display environment (e.g., will render properly in an expanded form) or if the subject content item display environment is above or below the fold.

Although the configuration determination instructions are described above as being accessed from a server on the second domain, in some implementations, the measuring instructions provided with the selected content item can include the configuration determination instructions. As such, the configuration determination instructions would not need to be remotely accessed.

Figure 3:
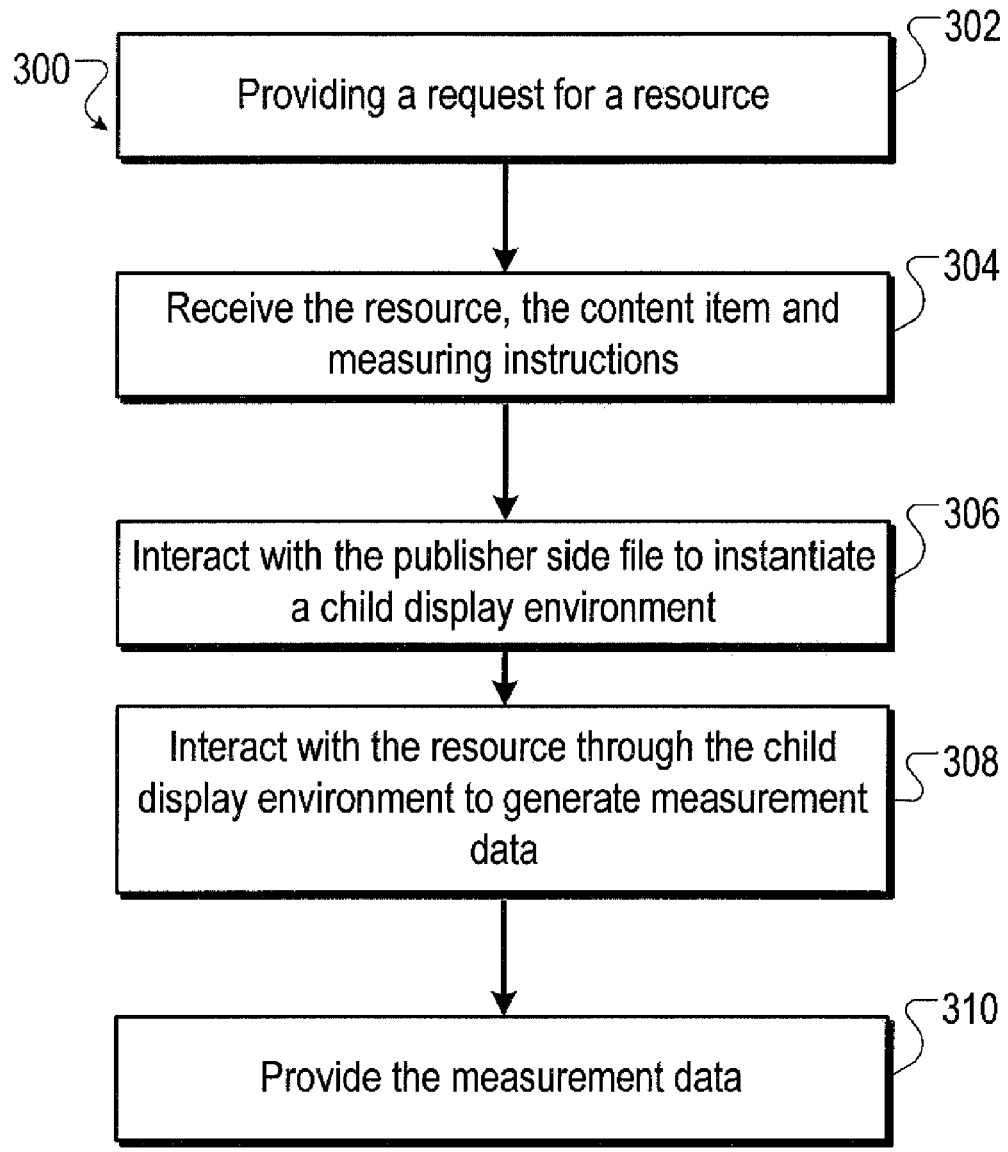
FIG. 3 is a flow diagram of an example process for generating measure data for a content item display environment.

FIG. 3 is a flow diagram of an example process 300 for generating measure data for a content item display environment. In some implementations, the process 300 is performed at a user device 106. The process 300 provides a request for a resource (302). For example, a user directs a user device 106 to a resource (e.g., enters the URL of the resource in the browser of the user device 106) and, in turn, the user device 106 sends a request for the resource 105 to the server hosting the resource 105.

The resource 105 is hosted by a server belonging to a first domain and includes a content item display environment (e.g., a third party iFrame advertisement slot) in which a content item (e.g., advertisement) can be displayed. The content item display environment is hosted by a device belonging to a second domain different from the first domain. As described above, a publisher side file hosted on a device belonging to the first domain facilitates display of the content item in the content item display environment.

The process 300 receives the resource, the content item and measuring instructions (304). For example, the user device 106 receives the resource 105 from the server hosting the resource 105, and receives the content item and measuring instructions from the content management and delivery system 110. In some implementations, a content item request for the content item is caused by instructions in the resource 105 and is sent to the content management and delivery system 110 by the user device 106 during the rendering process of the resource 105, and the user device 106 receives the content item and measuring instructions in response to the content item request. As described above, the measuring instructions cause the user device 106 to perform various operations including those in processes 306, 308 and 310 described below.

The process 300 interacts with the publisher side file to instantiate a child display environment in the content item display environment (306). For example, the measurement instructions cause the user device 106 to instantiate the child display environment in the content item display environment.

The process 300 interacts with the resource through the child display environment to generate measurement data for the content item display environment (308). For example, the measuring instructions cause the user device 106 to access the configuration determination instructions, which, in turn, cause the user device 106 to generate measurement data. As described above, the measurement data specify a configuration of the content item display environment and the resource 105.

The process 300 provides the measurement data to a data aggregator (310). For example, the measuring or configuration determination instructions cause the user device 106 to provide the measurement data to the measurement determination system 120.

Processes 200 and 300 can repeated many times for many different content item display environment/resource pairs to obtain measurement data for the pairs and to update or validate previously obtained measurement data, as resource configurations change over time.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. A computer storage medium is not a propagated signal and does not include transitory signals. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs miming on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Figure 4:
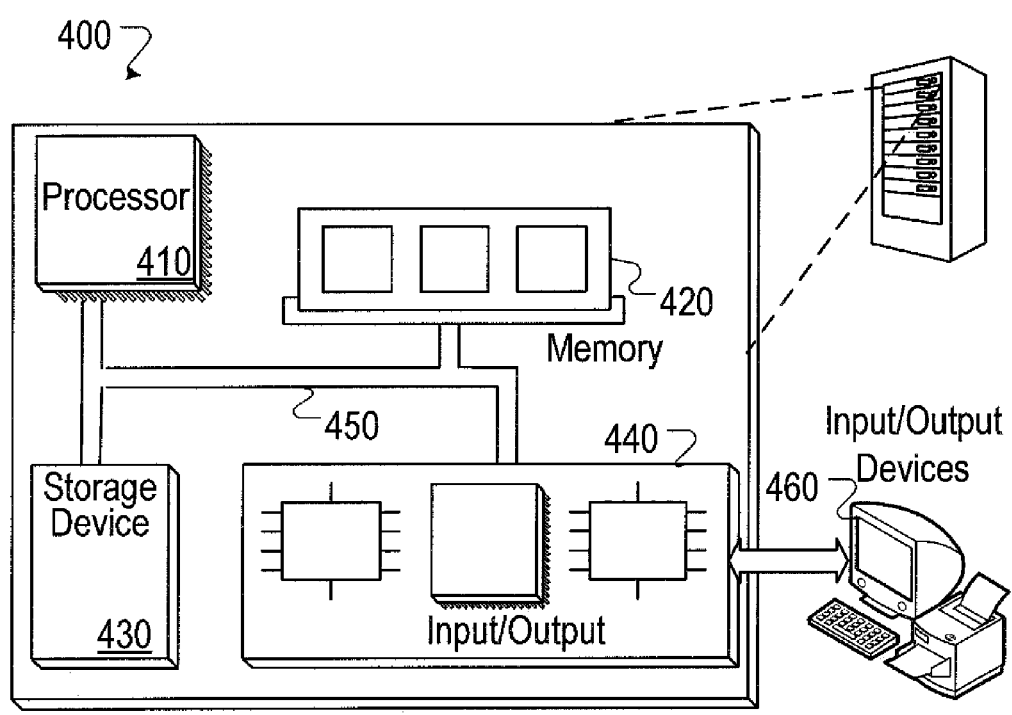
FIG. 4 is a block diagram of a programmable processing system.

An example of one such type of computer is shown in FIG. 4, which shows a block diagram of a programmable processing system (system). The system 400 that can be utilized to implement the systems and methods described herein. The architecture of the system 400 can, for example, be used to implement a computer client, a computer server, or some other computer device.

The system 400 includes a processor 410, a memory 420, a storage device 430, and an input/output device 440. Each of the components 410, 420, 430, and 440 can, for example, be interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can, for example, include a hard disk device, an optical disk device, or some other large capacity storage device.

The input/output device 440 provides input/output operations for the system 400. In one implementation, the input/output device 440 can include one or more of a network interface device, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 460.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method comprising:
   receiving, by a content server from a client device, a first content item request for content for inclusion in a content item display environment of a resource hosted from a first network domain, the content item display environment hosted from a second network domain different from the first network domain;
   providing, by the content server, responsive to receiving the first content item request, a first content item and instructions causing the client device to generate a child display environment of the content item display environment by interacting with a publisher side file hosted by a device in the first network domain,
   the instructions further causing the client device to transmit a parameterized request from the client device to the device in the first network domain, the parameterized request passing parameters to access configuration determination instructions that cause the client device to generate, using the child display environment, measurement data for the resource and for the content item display environment;
   receiving, from the client device, the generated measurement data specifying a configuration of the content item display environment and the resource;
   determining that a position of the content item display environment permits an expandable advertisement to be expanded without intersecting a boundary of the resource;
   receiving, by the content server, a second content item request for content to display in the content item display environment, the second content item request received subsequent to the first content item request;
   selecting, by the content server, a second content item from a plurality of second content items based at least in part on the measurement data, and based at least on the determination that a position of the content item display environment permits an expandable advertisement to be expanded without intersecting a boundary of the resource, wherein the second content item is an expandable advertisement; and
   providing, by a content server, data specifying the selected second content item responsive to the second content item request, the data specifying the selected second content item causing the client device to display the selected second content item.

2. The method of claim 1, wherein the first content item is an above-the-fold advertisement displayed in a viewport of a client device rendering the resource upon an initial rendering of the resource.

3. A system comprising:
one or more physical processors;
and instructions stored on a computer storage apparatus that when executed by the one or more processors cause the one or more data processors to perform operations comprising:
- receiving, by a content server from a client device, a first content item request for content for inclusion in a content item display environment of a resource hosted from a first network domain, the content item display environment hosted from a second network domain different from the first network domain;
- providing, by the content server, responsive to receiving the first content item request, a first content item and instructions causing the client device to generate a child display environment of the content item display environment by interacting with a publisher side file hosted by a device in the first network domain,
- the provided instructions further causing the client device to transmit a parameterized request from the client device to the device in the first network domain, the parameterized request passing parameters to access configuration determination instructions that cause the client device to generate, using the child display environment, measurement data for the resource and for the content item display environment;
- receiving, from the client device, the generated measurement data specifying a configuration of the content item display environment and the resource;
- determining that a position of the content item display environment permits an expandable advertisement to be expanded without intersecting a boundary of the resource;
- receiving, by the content server, a second content item request for content to display in the content item display environment, the second content item request received subsequent to the first content item request;
- selecting, by the content server, a second content item from a plurality of second content items based at least in part on the measurement data, and based at least on the determination that a position of the content item display environment permits an expandable advertisement to be expanded without intersecting a boundary of the resource, wherein the second content item is an expandable advertisement; and
- providing, by a content server, data specifying the selected second content item responsive to the second content item request, the data specifying the selected second content item causing the client device to display the selected second content item.

4. The system of claim 1, wherein the first content item is an above-the-fold advertisement displayed in a viewport of a client device rendering the resource upon an initial rendering of the resource.

5. A non-transitory computer-readable storage medium having instructions stored thereon, which, when executed by one or more data processors, cause the one or more processors to perform operations comprising:

- receiving, by a content server, a first content item request for content for inclusion in a content item display environment of a resource hosted from a first network domain, the content item display environment hosted from a second network domain different from the first network domain;
- providing, by the content server, responsive to receiving the first content item request, a first content item and instructions causing the client device to generate a child display environment of the content item display environment by interacting with a publisher side file hosted by a device in the first network domain,
- the provided instructions further causing the client device to transmit a parameterized request from the client device to the device in the first network domain, the parameterized request passing parameters to access configuration determination instructions that cause the client device to generate, using the child display environment, measurement data for the resource and for the content item display environment;
- receiving, from the client device, the generated measurement data specifying a configuration of the content item display environment and the resource;
- determining that a position of the content item display environment permits an expandable advertisement to be expanded without intersecting a boundary of the resource;
- receiving, by the content server, a second content item request for content to display in the content item display environment, the second content item request received subsequent to the first content item request;
- selecting, by the content server, a second content item from a plurality of second content items based at least in part on the measurement data, and based at least on the determination that a position of the content item display environment permits an expandable advertisement to be expanded without intersecting a boundary of the resource, wherein the second content item is an expandable advertisement; and
- providing, by a content server, data specifying the selected second content item responsive to the second content item request, the data specifying the selected second content item causing the client device to display the selected second content item.

6. The method of claim 1, wherein the publisher side file comprises data defining a blank hypertext markup language (HTML) page.

7. The system of claim 3, wherein the publisher side file comprises data defining a blank hypertext markup language (HTML) page.

8. The non-transitory computer-readable storage medium of claim 5, wherein the publisher side file comprises data defining a blank hypertext markup language (HTML) page.

9. The non-transitory computer-readable storage medium of claim 5, wherein the first content item is an above-the-fold advertisement displayed in a viewport of a client device rendering the resource upon an initial rendering of the resource.

* * * * *